(12) United States Patent
Ramachandran et al.

(10) Patent No.: US 10,041,470 B2
(45) Date of Patent: Aug. 7, 2018

(54) WIND TURBINE BLADE HAVING A SHAPED STALL FENCE OR FLOW DIVERTER

(71) Applicant: LM WP PATENT HOLDING A/S, Kolding (DK)

(72) Inventors: Dhinagaran Ramachandran, Bangalore (IN); Jesper Madsen, Gesten (DK); Rajkumar Rajamani, Tamilnadu (IN)

(73) Assignee: LM WIND POWER A/S, Kolding (DK)

( * ) Notice: Subject to any disclaimer, the term of this patent is extended or adjusted under 35 U.S.C. 154(b) by 639 days.

(21) Appl. No.: 14/377,973

(22) PCT Filed: Feb. 14, 2013

(86) PCT No.: PCT/EP2013/052961
§ 371 (c)(1),
(2) Date: Aug. 11, 2014

(87) PCT Pub. No.: WO2013/120946
PCT Pub. Date: Aug. 22, 2013

(65) Prior Publication Data
US 2015/0017008 A1    Jan. 15, 2015

(30) Foreign Application Priority Data
Feb. 17, 2012  (EP) .................................. 12155874

(51) Int. Cl.
*F01D 5/14* (2006.01)
*F03D 1/06* (2006.01)

(52) U.S. Cl.
CPC ......... *F03D 1/0641* (2013.01); *F03D 1/0633* (2013.01); *F05B 2240/221* (2013.01); *F05B 2240/30* (2013.01); *Y02E 10/721* (2013.01)

(58) Field of Classification Search
CPC .... F03D 1/0641; F03D 1/0633; F03D 1/0608; F03D 1/065
(Continued)

(56) References Cited

U.S. PATENT DOCUMENTS 1,718,869 A * 6/1929 Somerset .............. F03D 1/0608
                                                    416/236 R
5,058,837 A * 10/1991 Wheeler ................. B64C 23/06
                                                    244/198
(Continued)

FOREIGN PATENT DOCUMENTS

WO    0116482 A1    3/2001
WO    0208600 A1    1/2002
(Continued)

*Primary Examiner* — Logan Kraft
*Assistant Examiner* — Jason Fountain
(74) *Attorney, Agent, or Firm* — Nath, Goldberg & Meyer; Jerald L. Meyer (57) ABSTRACT

A wind turbine blade is described wherein at least one stall fence is provided on the blade surface, where the stall fence is arranged such that it extends at an angle to the chord of the blade. The stall fence acts to re-direct airflow over the blade, to improve wind turbine performance. The stall fence may be a provided towards the blade root end, acting to divert airflow towards the root end of the blade to prevent separation of attached airflow. Additionally or alternatively, the stall fence may be arranged as a flow diverter provided towards the blade tip end, to increase airflow in the tip region for increased performance and/or to disrupt the formation of tip vortices.

15 Claims, 9 Drawing Sheets

(58) Field of Classification Search
USPC ..................................................... 416/236 R
See application file for complete search history.

(56) References Cited

U.S. PATENT DOCUMENTS

| | | | | |
|---|---|---|---|---|
| 7,585,157 | B2 * | 9/2009 | Quell | F03D 1/0633 |
| | | | | 416/236 R |
| 7,637,715 | B2 * | 12/2009 | Battisti | F03D 80/40 |
| | | | | 290/55 |
| 8,083,491 | B2 * | 12/2011 | Garcillan Rueda | F03D 1/0641 |
| | | | | 415/115 |
| 8,182,231 | B2 * | 5/2012 | Corten | F03D 1/0641 |
| | | | | 416/223 R |
| 8,777,580 | B2 * | 7/2014 | Eisenberg | F03D 1/0633 |
| | | | | 416/239 |
| 9,140,233 | B2 * | 9/2015 | Watts | F03D 1/0633 |
| 9,303,621 | B2 * | 4/2016 | Fuglsang | F03D 1/0641 |
| 2006/0280614 | A1 | 12/2006 | Quell et al. | |
| 2013/0224037 | A1 * | 8/2013 | Simpson | F01D 5/145 |
| | | | | 416/235 |
| 2015/0176564 | A1 * | 6/2015 | Kumar | F03D 1/0675 |
| | | | | 416/236 R |

FOREIGN PATENT DOCUMENTS

| | | | |
|---|---|---|---|
| WO | 2007114698 | A2 | 10/2007 |
| WO | 2007140771 | A1 | 12/2007 |
| WO | 2011097024 | A1 | 8/2011 |

* cited by examiner

WIND TURBINE BLADE HAVING A SHAPED STALL FENCE OR FLOW DIVERTER

This is a National Phase Application filed under 35 U.S.C. 371 as a national stage of PCT/EP2013/052961, filed Feb. 14, 2013, and claims priority benefit from European Application No. 12155874.6, filed Feb. 17, 2012, the content of each of which is hereby incorporated by reference in its entirety.

FIELD OF THE INVENTION

The present invention relates to a wind turbine blade having a shaped stall fence or flow diverter.

BACKGROUND OF THE INVENTION

In wind turbine blades, cross-flows of airflow sometimes propagate along the longitudinal length of the wind turbine blade, from the root end of the blade. Such cross-flows act to negatively impact on blade performance, in particular by contributing to airflow detachment from the surface of the blade, thereby affecting blade lift.

It is known to provide a barrier or stall fence which extends across the surface of a wind turbine blade, transverse to the longitudinal axis, to prevent the formation of such cross-flows. An example of such a wind turbine blade can be seen in U.S. Pat. No. 7,585,157.

While this system prevents the cross-flows from propagating along the blade length by providing a barrier between adjacent sections of the blade, during rotation of the wind turbine blades the centrifugal forces generated during rotation act to push airflow along the length of the blade towards the tip end. This results in the formation of low-pressure areas in the wake of the stall fences towards the trailing edge of the blades, resulting in flow separation and resultant reduction in blade performance.

It is an object of the invention to provide a wind turbine blade having a projecting member which provides improved performance over existing stall fence systems.

SUMMARY OF THE INVENTION

Accordingly, there is provided a wind turbine blade for a rotor of a wind turbine having a substantially horizontal rotor shaft, said rotor comprising a hub, from which the blade extends substantially in a radial direction when mounted to the hub, the blade having a longitudinal direction with a tip end and a root end and a transverse direction, the blade further comprising:
- a profiled contour including a pressure side and a suction side, as well as a leading edge and a trailing edge with a chord line having a chord length extending therebetween, where the chord line is arranged on a chordal plane, the profiled contour, when being impacted by an incident air-flow, generating a lift,
- the wind turbine further comprising at least one stall fence provided on a surface of said wind turbine blade, at least a section of said at least one stall fence extending along the transverse direction of said blade at an angle to said chord line or said chordal plane of between +/−15-60 degrees, preferably between +/−20-45 degrees, further preferably between +/−30-40 degrees, said at least one stall fence acting to direct attached flow over the profiled contour of said blade.

The use of an angled planar member as a stall fence allows for airflow over the surface of the blade to be directed towards particular sections of the blade to improve blade performance, e.g. increased lift, reduced drag, etc. If the stall fence is provided towards the root end of the blade, the stall fence acts to prevent cross-flow, as well as acting as a compressor towards the root end of the blade, increasing the pressure at the root end of the blade. On the outboard side of the stall fence, pressure will decrease and hence delay flow separation along the outboard sections of the blade. If the stall fence is provided towards the tip end of the blade, the stall fence can act as a flow diverter to move more airflow towards the tip section, where the performance benefits are greater.

Preferably, said at least one stall fence extends from a first end adjacent said leading edge to a second end adjacent said trailing edge, preferably wherein said first end is located within 0-5% of the length of said chord from said leading edge, preferably wherein said second end is located within 0-5% of the length of said chord from said trailing edge.

As the stall fence substantially extends between the leading and trailing edges of the blade, this allows for the attached flow to be routed across substantially the entire chordal length of the blade profile. The at least one stall fence may be arranged to extend substantially in the direction of the root end of the blade, forming a shaped root end stall fence. Additionally or alternatively, the at least one stall fence may be arranged to extend substantially in the direction of the tip end of the blade, forming a flow deflector.

Preferably, the height of said at least one stall fence above the surface of the blade is at least 1.5% of the chord length of the blade at the location of said at least one stall fence, further preferably at least 2% of the chord length.

The stall fence is selected to have a height which can impede cross-flow along the blade, and/or divert or redirect attached flow over the blade profile. In one aspect, the stall fence has a constant height along the length of the stall fence. In an alternative aspect, the stall fence increases in height along the length of the stall fence between the leading and trailing edges.

Preferably, at least a first section of said at least one stall fence extends at an angle α to said chordal plane, wherein said angle α is between approximately +/−15-60 degrees to said chordal plane, wherein said at least a first section extends along at least 30% of the chordal extent of the profiled contour, preferably along at least 50%, further preferably along at least 70%.

In this embodiment, a section of the stall fence extends at a particular angle to the chordal plane for at least a portion of the chordal length of the blade.

Preferably, said at least one stall fence extends from said first end to said second end at an angle α to said chordal plane, wherein said angle α is between approximately +/−15-60 degrees to said chordal plane.

In this embodiment, the entire stall fence is provided at an angle to the chord of the blade, such that a continual deflection of airflow of the blade can be achieved.

Preferably, said at least one stall fence extends from said first end to said second end at an angle α to said chordal plane, wherein angle α varies from approximately 0 degrees at said first end to approximately +/−30-60 degrees at said second end, preferably +/−45 degrees.

In this embodiment, the angle which the stall fence makes to the chord of the blade varies with distance along the length of the stall fence. The stall fence has an angle α of approximately 0 degrees towards the leading edge of the blade, to reduce any impact on aerodynamic performance towards the blade leading edge. The angle α at the second end of the stall fence may be selected to provide maximum deflection of airflow, with minimum impact on aerodynamic performance. The angle α at the second end may be selected from any of the following: approximately 15, 30, 45 degrees.

In a preferred embodiment, angle α varies linearly between said first end and said second end.

This provides for a constant variation of the angle α along the length of the stall fence. In an alternative embodiment, the rate of change of angle α may vary along the length of the stall fence, from a low rate of change, e.g. 0-5%, towards the first end of the stall fence, to a higher rate of change, e.g. 5-50%, towards the second end of the stall fence.

Preferably, said at least one stall fence projects from a surface of said wind turbine blade, at a constant angle β to said surface, wherein said angle β is selected from the range between 45-135 degrees.

The angle of projection of the stall fence may be any suitable angle, and not limited to a 90 degree angle with respect to the surface of the blade.

Alternatively, said at least one stall fence projects from a surface of said wind turbine blade, at an angle β to said surface, wherein said angle β varies from approximately 0 degrees at said first end to between approximately 45-180 degrees at said second end, preferably between 90-180 degrees, preferably between 90-135 degrees, alternatively between 45-90 degrees.

The stall fence may be shaped or comprise a twist to provide improved performance when re-directing flow over the surface of the blade.

Preferably, said angle β varies linearly between said first end and said second end.

Additionally or alternatively, at least a section of said at least one stall fence comprises a cross-section having a curved portion.

The curved section of the stall fence allows for the airflow to be more efficiently redirected over the surface of the wind turbine blade.

Preferably, said at least one stall fence comprises a base end adjacent a surface of said blade, and a tip end distal from said surface, wherein at least a section of said at least one stall fence comprises a curved portion between said base end and said tip end, wherein the tangential angle θ of said curved portion varies between a first angle towards said base end and a second angle towards said tip end, wherein said first angle is substantially orthogonal to the surface of the wind turbine blade and wherein said second angle is substantially parallel to the surface of the wind turbine blade. Preferably, said first angle is between 45-135 degrees to the surface of the wind turbine blade. Preferably, said second angle is between 135-215 degrees to the surface of the wind turbine blade.

Preferably, θ is measured in the direction of the root end of the blade. In one embodiment, θ varies between approximately 90-180 degrees to the surface of the wind turbine blade. In this embodiment, the tip end of the curved section points substantially in the direction of the tip end of the wind turbine blade.

In an alternative embodiment, θ varies between approximately 90-0 degrees to the surface of the wind turbine blade. In this embodiment, the tip end of the curved section points substantially in the direction of the root end of the wind turbine blade.

In a preferred embodiment, said at least a section of said at least one stall fence is curved along the entire height of said stall fence between said base end and said tip end.

A constantly curving member acts to provide a duct to route airflow across the blade, Alternatively, said at least a section of said at least one stall fence comprises a substantially straight portion provided at the base end of said stall fence and a curved portion provided at the tip end of said stall fence, said substantially straight portion having a constant angle β to the surface of said wind turbine blade, said curved portion having a varying tangential angle θ.

As an alternative, only a portion of the stall fence may be curved along the height of the stall fence. This may increase the difficulty for airflow to route over the tip or tip end of the stall fence.

In one embodiment, the at least one stall fence may be formed from several individual sections. Preferably, said sections may be assembled to form a single continuous stall fence. Alternatively, said sections may be provided on said wind turbine blade spaced from each other, said spaced sections acting to form an array of stall fences, said array forming a virtual stall fence or flow diverter.

In a further embodiment, the at least one stall fence comprises at least one gap provided along the length of the stall fence between a first end of said stall fence and a second end of said stall fence, wherein said gap acts to equalise pressure across the at least one stall fence, to lower the drag effect caused by the at least one stall fence.

In one embodiment, said gap is formed by a through-going channel provided in said at least one stall fence.

Alternatively, said stall fence is formed from a plurality of discrete stall fence components provided on the surface of the wind turbine blade, said discrete stall fence components substantially in line with a nominal stall fence profile, wherein at least one gap is formed by a spacing between adjacent discrete stall fence components.

Adjacent discrete stall fence components may be offset relative to a nominal stall fence profile to provide a gap extending across a section of the width of the nominal stall fence as well as a section of the length of the nominal stall fence.

Preferably, the wind turbine blade comprises a plurality of stall fences provided on the surface of the wind turbine blade. Additionally or alternatively, said at least one stall fence may be provided on at least a section of the pressure side of the wind turbine blade.

Preferably, said at least one stall fence is provided on said suction side towards the root end of said blade, wherein said at least one stall fence extends from a first end adjacent said leading edge to a second end, wherein at least a section of the at least one stall fence extends from said first end towards said second end at a substantially acute angle to said chord line, taken in the direction of the root end of the blade.

As at least a section of the stall fence is arranged at an angle to the chord line towards the root end of the blade, then attached flow over the blade contour will be directed towards the root end of the blade, thereby delaying separation of the flow during rotation of the blade. An acute angle is taken to mean an angle of between 0-90 degrees with respect to the chord line of the blade, taken in the direction of the root end of the blade.

Preferably, said at least one stall fence projects from the surface of said wind turbine blade at an angle β to said surface, wherein said at least one stall fence projects substantially in the direction of the root end of the wind turbine blade.

Preferably, said at least one stall fence is provided on said suction side within 0-50% of the length of said wind turbine blade from said root end.

The shaped stall fence is located in the root end half of the blade, firstly to prevent lengthwise airflow along the length of the blade, and secondly to prevent flow separation at the root end of the blade due to the relatively thick cross-section of the blade at the root end of the blade.

Preferably, said first end of said at least one stall fence is located on said suction side within 0-5% of the length of said chord from said leading edge.

Alternatively, wherein said first end of said at least one stall fence projects beyond said leading edge, said first end forming a leading edge deflector, to direct airflow at the leading edge of said wind turbine blade towards said root end.

As the stall fence is arranged to project beyond the leading edge of the blade, the presence of at least one leading edge deflector helps to reduce outbound flow along the length of the blade.

Preferably, said leading edge deflector extends from said first end towards the root end of said blade, said leading edge deflector extending at an acute angle to a nominal chord line extended beyond said leading edge.

As the leading edge deflector is provided at an angle, the leading edge deflector provides for further re-direction of flow towards the root end of the blade, reducing the effect of flow separation at the blade root end.

Preferably, said second end of said at least one stall fence is located on said suction side within 0-5% of the length of said chord from said trailing edge.

In this embodiment, the stall fence extends across substantially the entire chordal length of the blade.

Preferably, the wind turbine blade comprises at least one flow diverter provided on said suction side towards the tip end of said blade, wherein said at least one flow diverter extends from a first end adjacent said leading edge to a second end, wherein at least a section of the at least one flow diverter extends towards said tip end at a substantially acute angle to said chord, to direct laminar flow over the profiled contour towards said tip end.

The flow diverter acts to increase airflow towards the outer area of the blade, to improve blade performance by modifying the blade tip vortex.

Preferably, said at least one flow diverter projects from the surface of said wind turbine blade at an angle β to said surface, wherein said at least one flow diverter projects substantially in the direction of the tip end of the wind turbine blade.

There is also provided a wind turbine blade having a planar member projecting from a surface of the wind turbine blade, preferably a stall fence or a flow diverter, wherein at least a portion of said planar member comprises a substantially curved cross-sectional profile.

In such a system, a planar member, which may extend substantially between a trailing edge and a leading edge of a blade, is enhanced by the addition of a curved cross-section, as described above for the shaped or angled planar member system.

There is provided a projecting planar member for a blade may be provided having an angle α with respect to the chordal plane of the blade, and an angle β with respect to the blade surface, the planar member arranged such that the values α and/or β vary between the first and second ends of the planar member, preferably in a linear variation along at least 30% of the length of the planar member.

Additionally or alternatively, there is further provided a wind turbine blade having a planar member provided on a surface of said blade, the planar member extending substantially between the leading edge and the trailing edge of said wind turbine blade, wherein at least a portion of said planar member comprises a curved cross-section.

It will be understood that the feature of a planar member, e.g. a flow diverter or a stall fence, having a curved cross-section may be implemented separately to the arrangement of a planar member provided at an acute angle to the chordal plane of a wind turbine blade.

There is further provided a wind turbine having at least one wind turbine blade as described above.

DESCRIPTION OF THE INVENTION

An embodiment of the invention will now be described, by way of example only, with reference to the accompanying drawings, in which.

It will be understood that elements common to the different embodiments of the invention have been provided with the same reference numerals in the drawings.

Figure 1:
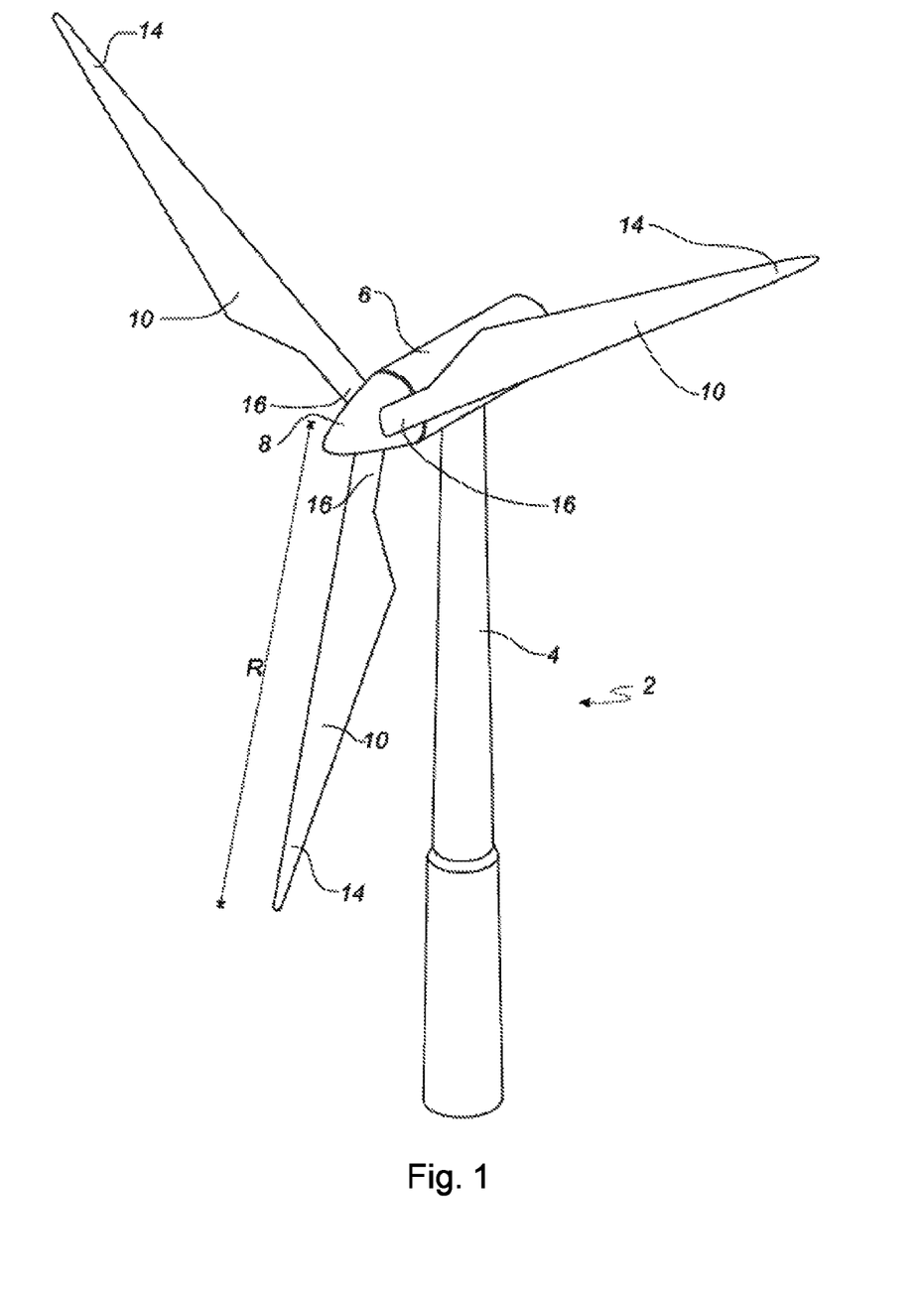
FIG. 1 shows a wind turbine.

FIG. 1 illustrates a conventional modern upwind wind turbine 2 according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8. The rotor has a radius denoted R.

Figure 2:
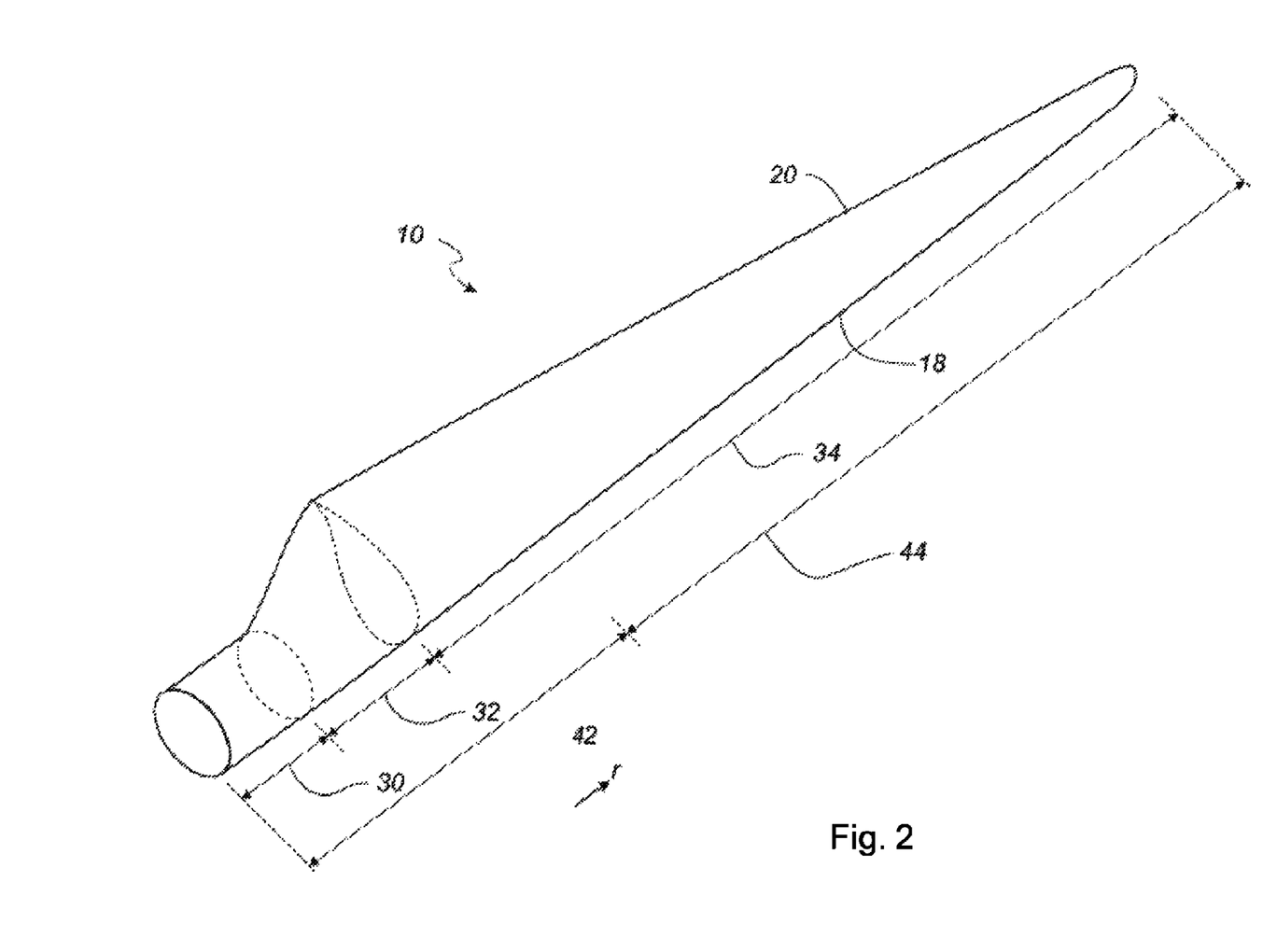
FIG. 2 shows a schematic view of a wind turbine blade according to the invention.

FIG. 2 shows a schematic view of a wind turbine blade 10. The wind turbine blade 10 has the shape of a conventional wind turbine blade and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 is typically constant along the entire root area 30. The transition region 32 has a transitional profile 42 gradually changing from the circular or elliptical shape 40 of the root region 30 to the airfoil profile 50 of the airfoil region 34. The chord length of the transition region 32 typically increases substantially linearly with increasing distance r from the hub.

The airfoil region 34 has an airfoil profile 50 with a chord extending between the leading edge 18 and the trailing edge 20 of the blade 10. The width of the chord decreases with increasing distance r from the hub.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

Figure 3:
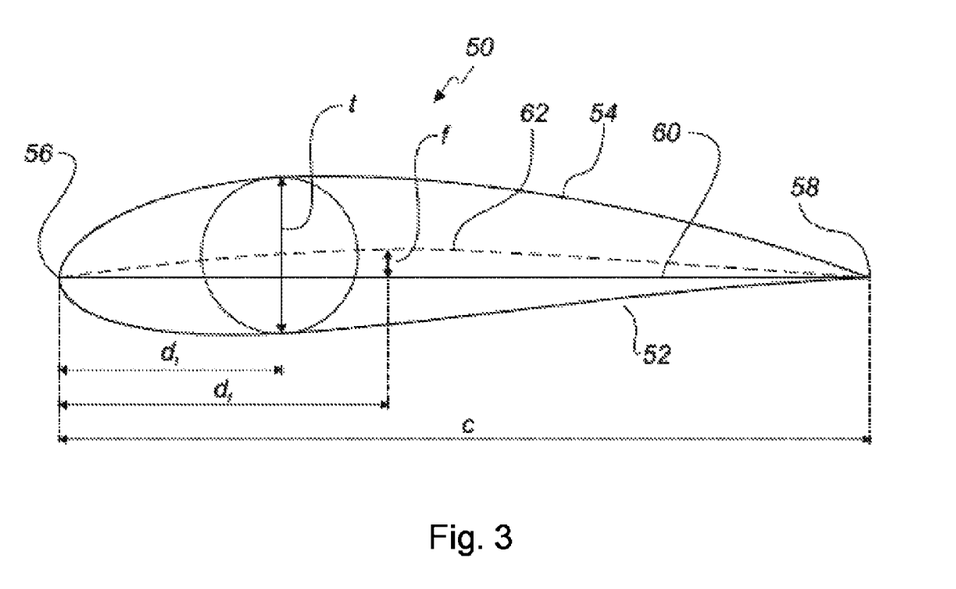
FIG. 3 shows a schematic view of an airfoil profile of the blade of FIG. 2.

FIG. 3 shows a schematic view of an airfoil profile 50 of a typical blade of a wind turbine depicted with the various parameters, which are typically used to define the geometrical shape of an airfoil. The airfoil profile 50 has a pressure side 52 and a suction side 54, which during use—i.e. during rotation of the rotor—normally face towards the windward (or upwind) side and the leeward (or downwind) side, respectively. The airfoil 50 has a chord 60 with a chord length c extending between a leading edge 56 and a trailing edge 58 of the blade. The airfoil 50 has a thickness t, which is defined as the distance between the pressure side 52 and the suction side 54. The thickness t of the airfoil varies along the chord 60. The deviation from a symmetrical profile is given by a camber line 62, which is a median line through the airfoil profile 50. The median line can be found by drawing inscribed circles from the leading edge 56 to the trailing edge 58. The median line follows the centres of these inscribed circles and the deviation or distance from the chord 60 is called the camber f. The asymmetry can also be defined by use of parameters called the upper camber and lower camber, which are defined as the distances from the chord 60 and the suction side 54 and pressure side 52, respectively.

Airfoil profiles are often characterised by the following parameters: the chord length c, the maximum camber f, the position df of the maximum camber f, the maximum airfoil thickness t, which is the largest diameter of the inscribed circles along the median camber line 62, the position dt of the maximum thickness t, and a nose radius (not shown). These parameters are typically defined as ratios to the chord length c. Preferably, the wind turbine blades according to the invention exceed 40 meters in length.

Figure 4:
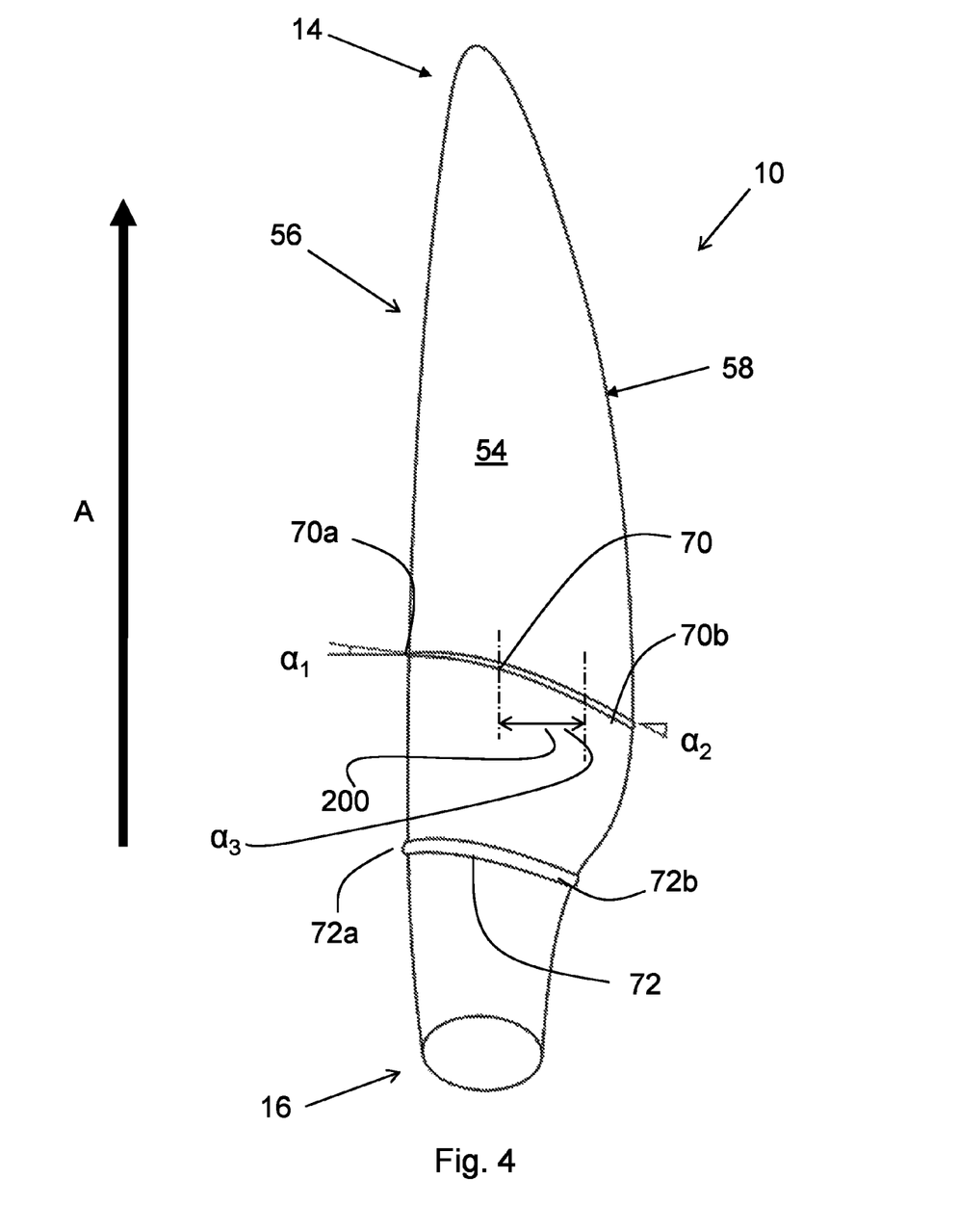
FIG. 4 shows a plan view of a wind turbine blade having at least one stall fence according to a first embodiment of the invention.

With reference to FIG. 4, an embodiment of a wind turbine blade 10 according to the invention is illustrated. A first stall fence 70 and a second stall fence 72 project from the surface of the suction side 54 of the blade 10, the first and second stall fences 70,72 extending from respective first ends 70a,72a adjacent the blade leading edge 56, to respective second ends 70b,72b adjacent the blade trailing edge 58.

The first and second stall fences 70,72 are provided as stall fences or barriers, projecting from the blade surface to prevent or impede airflow along the longitudinal direction of the blade 10, as indicated by the arrow A. The first and second stall fences 70,72 are located towards the root region of the blade 10, preferably within 50% of the longitudinal length of the blade from the root end 16.

Furthermore, the first and second stall fences 70,72 are arranged to extend from said first ends 70a,72a towards said second ends 70b,72b at an acute angle to the chordal plane of the blade profile taken in the direction of the blade root end 16, the chordal plane being the plane orthogonal to the longitudinal axis of the blade 10 as indicated by the arrow A. The first and second stall fences 70,72 extend from said first ends 70a,72a at the leading edge 56 towards said second ends 70b,72b at the trailing edge 58 at an acute angle in the direction of the root end 16 of the blade 10.

According to an embodiment of the present subject matter, at least a section 200 of the at least one stall fence 70 has an angle $\alpha_3 = +/- 15$-$60$ degrees to the chordal plane.

As the blade 10 rotates on a wind turbine 2, the centrifugal effect of the rotation effectively pushes the radial airflow towards the tip end 14 of the blade 10, which causes the root side flow separation to migrate towards the tip end 14.

Figure 5:
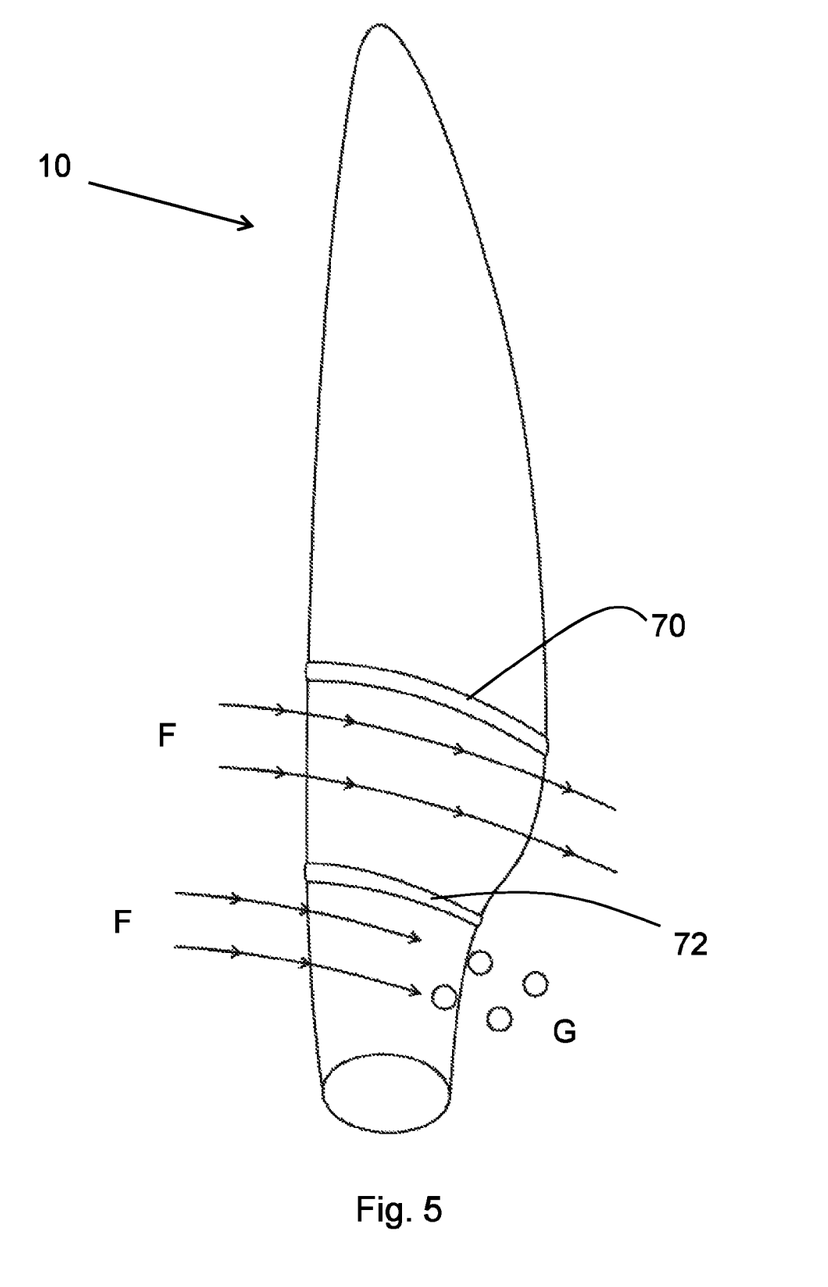
FIG. 5 shows a plan view of the wind turbine blade of FIG. 4 when impacted by an incident airflow.

With reference to FIG. 5, the provision of angled stall fences 70,72 towards the root end 16 of the blade 10 act to divert the airflow (indicated by arrows F) over the blade 10 in the root region, to direct the airflow towards the root end 16 of the blade 10, against the centrifugal forces. Accordingly, the angled stall fences 70,72 act to negate the radial pressure gradient created by the rotor blade, and reduce the flow separation moving towards the tip end 14 of the blade 10. This redirection of the airflow towards the root end 16 acts to regulate the pressure across the blade, thereby delaying airflow separation, and increasing blade lift and associated performance. The shaped stall fences can be further used to minimise turbulent vortices at the root end of the blade (indicated at G), thereby improving performance by decreasing drag.

In a first aspect, the angle $\alpha$ that the first and/or second stall fences or stall fences 70,72 make to the chordal plane of the wind turbine blade 10 may vary along the length of the first and/or second stall fences 70,72. For example, in the embodiment of FIG. 4, the angle $\alpha$ of the first stall fence 70 varies from a first value $\alpha_1$ at the first end 70a of the stall fence to a second value $\alpha_2$ at the second end 70b of the stall fence. Preferably, $\alpha_1$ is approximately 0 degrees, while $\alpha_2$ is between approximately 30-60 degrees. Accordingly, the stall fence 70 is varied to be substantially in line with the chordal plane of the blade 10 at the blade leading edge 56, and relatively offset from the chordal plane towards the trailing edge 58. This allows for the shape of the stall fence 70 to be varied along the length of the stall fence 70, so as to minimise the effect of blade performance at the leading edge 56 of the blade 10 (due to the minimised offset from the chord line of the blade) while providing a substantial redirection of airflow at the blade trailing edge 58.

In the embodiment of FIG. 4, the angle $\alpha$ made by the stall fences 70,72 varies substantially along the length of the stall fences, but it will be understood that alternative configurations may be implemented. In a first aspect, at least one of the stall fences 70,72 may extend at a constant angle $\alpha$ to the chordal plane. Additionally or alternatively, at least one of the stall fences may extend at a constant angle $\alpha$ along at least 30%, preferably at least 50%, further preferably at least 70% of the length of the stall fence. $\alpha$ may be selected as any suitable angle, e.g. between 30-60 degrees to the chordal plane, in the direction of the root end 16 of the blade 10.

Figure 6:
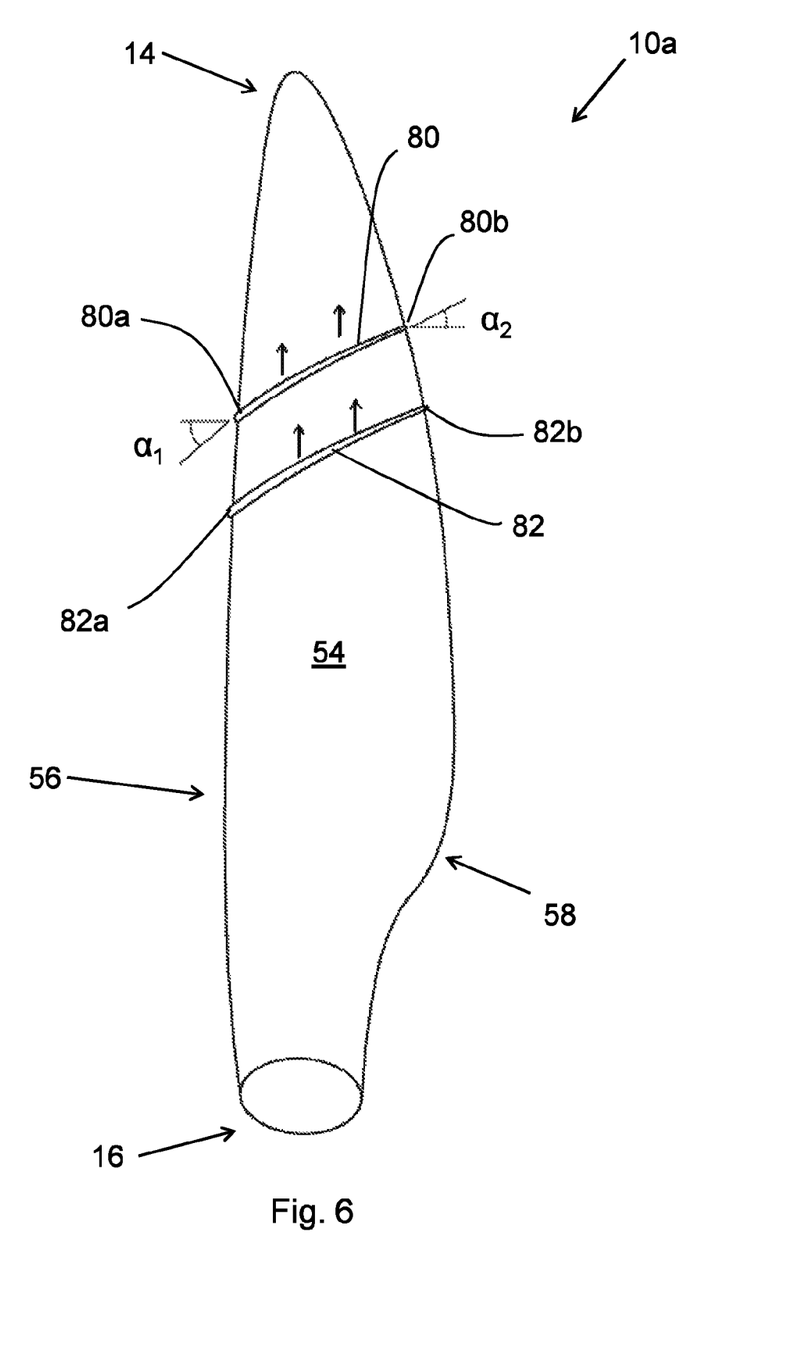
FIG. 6 shows a plan view of a wind turbine blade having at least one stall fence according to a second embodiment of the invention.

With reference to FIG. 6, a further embodiment of a wind turbine blade according to the invention is indicated at 10a. In this embodiment, first and second flow diverters 80,82 are provided as stall fences projecting from the surface of the suction side 54 of the blade 10, the first and second flow diverters 80,82 extending from respective first ends 80a,82a adjacent the blade leading edge 56, to respective second ends 80b,82b adjacent the blade trailing edge 58.

The first and second flow diverters 80,82 are arranged to extend from said first ends 80a,82a towards said second ends 80b,82b at an acute angle to the chordal plane of the blade profile, in the direction of the blade tip end 14. Accordingly, the first and second flow diverters 80,82 project from the blade surface to divert airflow over the blade in an outboard direction towards the tip end 14 of the blade 10a (in the direction of the arrows T). The first and second flow diverters 80,82 are located towards the tip region of the blade 10*a*, preferably within 50% of the longitudinal length of the blade from the tip end 14.

By pushing airflow in an outboard direction, the blade 10*a* is able to take advantage of the increased blade lift performance towards the blade tip end 14, thereby improving overall turbine performance.

As with the embodiment of FIG. 4, the first and second flow diverters 80,82 generally extend at an angle α to the chordal plane of the wind turbine blade 10*a*. In the embodiment of FIG. 6, a is an acute angle measured from the chordal plane of the blade 10*a* in the direction of the blade tip end 14.

In a first aspect, the angle α that the first and/or second flow diverters 80,82 make to the chordal plane of the wind turbine blade 10 may vary along the length of the flow diverters 80,82. For example, in the embodiment of FIG. 6, the angle α of the first flow diverter 80 varies from a first value $α_1$ at the first end 80*a* of the flow diverter to a second value $α_2$ at the second end 80*b* of the flow diverter. Preferably, $α_1$ is approximately 0 degrees, while $α_2$ is between approximately 30-60 degrees, in the direction of the blade tip end 14.

Accordingly, the flow diverter 80 is varied to be substantially in line with the chordal plane of the blade 10 at the blade leading edge 56, and relatively offset from the chordal plane towards the trailing edge 58. As with the embodiment of FIG. 4, This allows for the shape of the flow diverter 80 to be varied along the length of the diverter, so as to minimise the effect of blade performance at the leading edge 56 of the blade 10 (due to the minimised offset from the chord line of the blade) while providing a substantial redirection of airflow at the blade trailing edge 58.

In an alternative implementation, at least one of the flow diverters 80,82 may extend at a constant angle α to the chordal plane, in the direction of the blade tip end 14. Additionally or alternatively, at least one of the flow diverters may extend at a constant angle α along at least 30%, preferably at least 50%, further preferably at least 70% of the length of the flow diverter. α may be selected as any suitable angle, e.g. between 30-60 degrees to the chordal plane, in the direction of the tip end 14 of the blade 10.

In the embodiments of FIGS. 4 and 6, the stall fences in the form of stall fences 70,72 or flow diverters 80,82 are arranged such that the respective first ends 70*a*,72*a*,80*a*,82*a* are adjacent the blade leading edge 56, and the respective second ends 70*b*,72*b*,80*b*,82*b* are adjacent the blade trailing edge 58. It will be understood that any suitable arrangement of the stall fences may be provided, for example the respective first ends 70*a*,72*a*,80*a*,82*a* may be provided within 0-5% of the leading edge 56, and/or the respective second ends 70*b*,72*b*,80*b*,82*b* may be provided within 0-5% of the trailing edge 58.

In an alternative embodiment, the stall fence 70,72,80,82 may extend along only a portion of the chordal extent of the wind turbine blade profile, e.g. between approximately 0-70% of the chordal length of the profile measured from the leading edge, between 0-70% of the chordal length of the profile measured from the trailing edge, or between 15-85% of the chordal length of the profile measured from the leading edge.

Figure 7A:
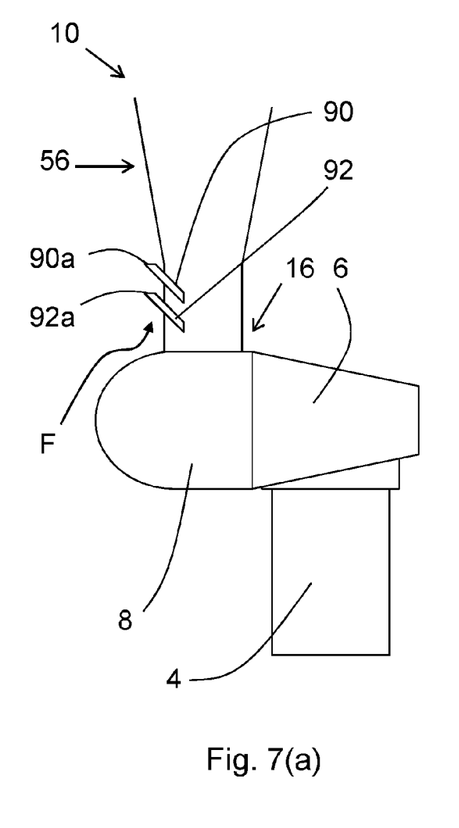
FIG. 7 shows a plan view of a wind turbine blade having at least one stall fence according to a third embodiment of the invention.
Figure 7B:
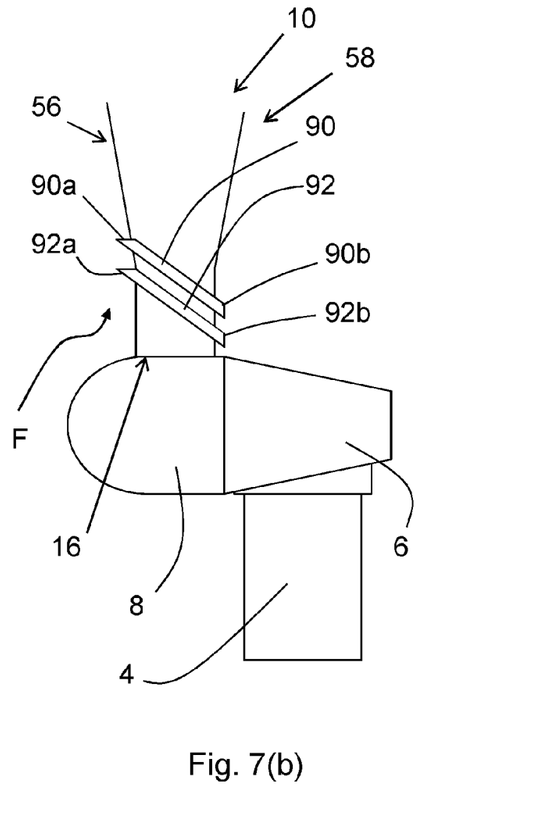

In a further enhancement of the invention, the respective first ends 70*a*,72*a*,80*a*,82*a* of the stall fences 70,72,80,82 may project beyond the leading edge 56 of the wind turbine blade 10. With reference to FIGS. 7(*a*) and (*b*), an enlarged view of a hub 8 and nacelle 6 section of a wind turbine 2 having a wind turbine blade 10 with first and second stall fences 90,92 are illustrated, said first and second stall fences 90,92 provided towards the root end 16 of the wind turbine blade 10. The respective first ends 90*a*,92*a* of the projecting stall fences 90,92 project proud of the leading edge 56 of the blade 10, such that the outbound airflow from the root end 16 of the blade and/or the flow diverted due to the presence of the hub 8 (as indicated by arrow F) is deflected and directed towards the blade root end 16, thereby preventing further cross-flow along the blade length, leading to subsequent separation of attached flow along the length of the blade 10.

In FIG. 7(*a*), the projecting stall fences 90,92 are illustrated as extending along a portion of the chordal length of the blade profile, preferably at an angle to the chordal plane of the blade in the direction of the blade root end 16, as described in the above embodiment of FIG. 4.

In FIG. 7(*b*), the projecting stall fences 90,92 are illustrated as extending along substantially the entire chordal length of the blade profile, preferably at an angle to the chordal plane of the blade in the direction of the blade root end 16, as described in the above embodiment of FIG. 4. Furthermore, the respective second ends 90*b*,92*b* of the projecting stall fences 90,92 may project beyond the trailing edge 58 of the blade 10, in order to provide for a more extensive flow redirection.

In a further enhancement of the invention, the stall fences 70,72,80,82,90,92 may comprise channels, spacing, or gaps defined in the members to provide for a venting of air pressure between either side of the members, to reduce or ameliorate any possible drag effect generated by the stall fences or any other feature which may have a negative impact on blade performance.

Figure 8:
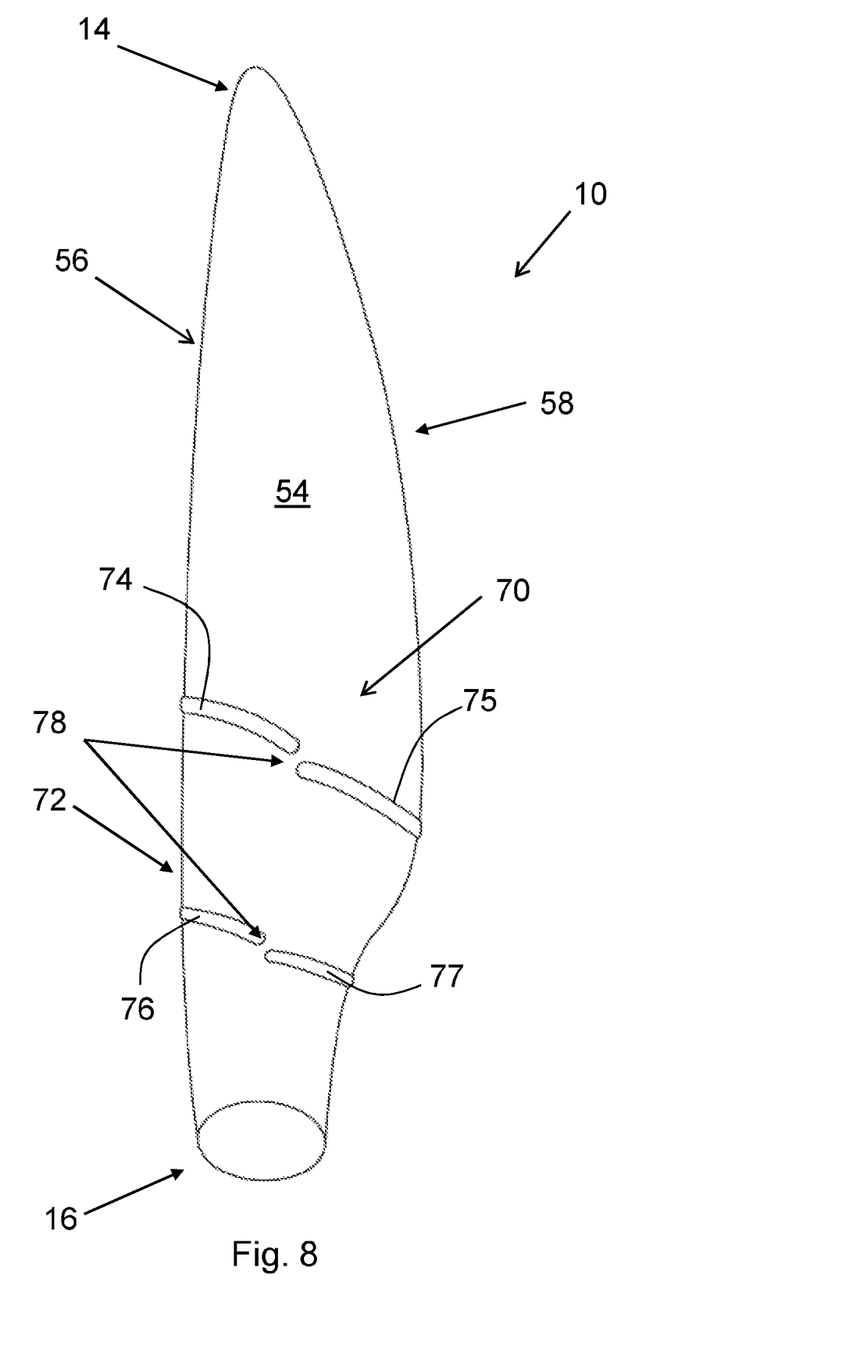
FIG. 8 shows a wind turbine blade having at least one stall fence according to a fourth embodiment of the invention and FIG. 9 illustrates a series of cross-sectional views of a stall fence of a wind turbine blade according to the invention.

With reference to FIG. 8, an embodiment of the invention is illustrated wherein first and second stall fences 70,72 are provided as two separate sections—first stall fence 70 provided as a first stall fence section 74 located towards the blade leading edge 56 and a second stall fence section 75 located towards the blade trailing edge 58, and second stall fence 72 provided as a first stall fence section 76 located towards the blade leading edge 56 and a second stall fence section 77 located towards the blade trailing edge 58. The sections are arranged such that a gap 78 is defined between the respective first stall fence sections 74,76 and the respective second stall fence sections 75,77, such a gap 78 allowing for a portion of airflow to vent or leak between the sides of the first and second stall fences 70,72 to provide for a pressure equalisation between the sides, and thereby reduce any negative lift characteristics associated with the shaped stall fences. Furthermore, the provision of the stall fences as an assembly of separate sections provides for increased ease of manufacturing and assembly, e.g. in the case of retrofitting such a shaped stall fence to an existing wind turbine blade.

In a further aspect of the invention, the cross-section of the stall fences may be shaped to provide for improved performance of the wind turbine blade. FIG. 9 illustrates several possible stall fence cross-sections for use with any of the embodiments of the invention, the stall fences 100 having a base end 100*a* provided at the surface 102 of a wind turbine blade 10, and a distal end 100*b*.

FIG. 9(*a*) illustrates a stall fence 100 which projects from the surface 102 of a wind turbine blade, wherein the stall fence 100 projects at an orthogonal angle β to the blade surface 102.

FIG. 9(*b*) illustrates a stall fence 100 which projects from the surface 102 of a wind turbine blade, wherein the stall fence 100 projects at an obtuse angle β to the blade surface 102. FIG. 9(c) illustrates a stall fence 100 which projects from the surface 102 of a wind turbine blade, wherein the stall fence 100 projects at an acute angle β to the blade surface 102.

Figure 9A:
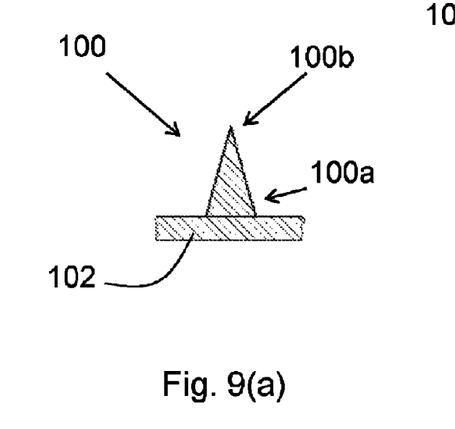
Figure 9B:
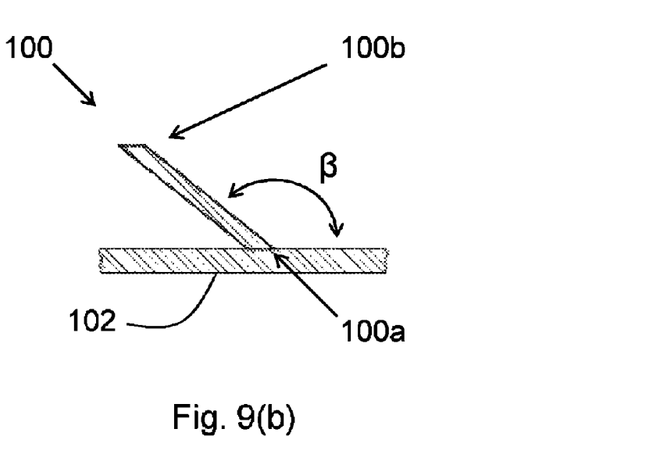
Figure 9C:
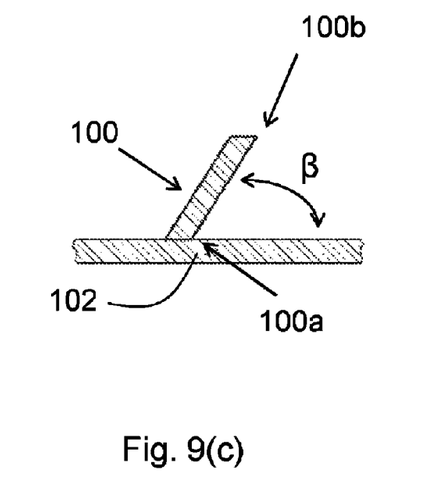

Preferably, the stall fences are arranged such that the tip ends 100b of the members substantially project in the direction of desired flow redirection, e.g. such that the stall fences 70,72 project at an acute angle β to the blade surface 102, measured in the direction of the blade root end 16. Similarly, preferably the flow diverters 80,82 project at an acute angle β to the blade surface 102, measured in the direction of the blade tip end 14 (or at an obtuse angle β measured in the direction of the blade root end 16). Preferably, the stall fence 100 projects at a constant angle β to said surface 102, wherein said angle β is selected from the range between +/−45-135 degrees.

Figure 9D:
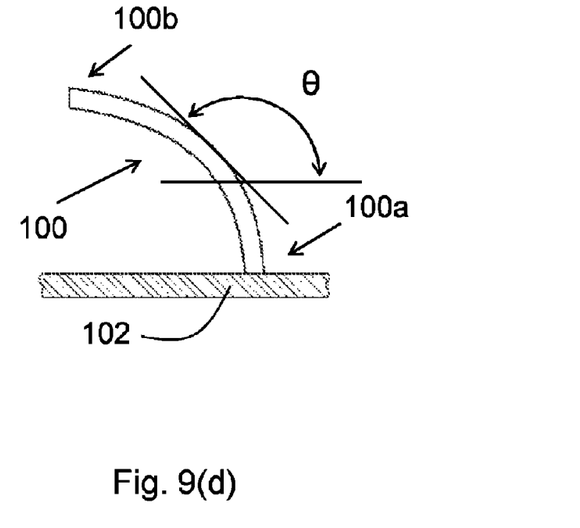

FIG. 9(d) illustrates a stall fence 100 which projects from the surface 102 of a wind turbine blade, wherein the stall fence 100 comprises a curved cross-section. In FIG. 9(d), the stall fence 100 is curved such that the base end 100a is substantially orthogonal to the blade surface 102, while the tip end 100b is substantially parallel to the blade surface 100, i.e. the tangential angle θ of the stall fence 100 varies between approximately 90 degrees at said base end 100a and approximately 180 degrees at said tip end 100b. However, it will be understood that other cross-sectional curve shapes may be implemented.

The provision of a shaped-cross-section of stall fence allows for a more effective redirection of airflow by the stall fences.

In a further enhancement of the invention, the cross-sectional shape of the stall fences 70,72,80,82,90,92 may vary between the respective first and second ends of said stall fences.

In a first aspect, the stall fence 100 may be shaped along the length of the stall fence such that the angle β varies from approximately 0 degrees at the first end of the stall fence, i.e. wherein the stall fence does not project proud of the surface of the wind turbine blade, to between approximately 35-180 degrees at the second end of the stall fence, i.e. wherein the stall fence may be shaped to redirect airflow with increasing effectiveness along the length of the stall fence. Preferably, the stall fence is shaped such that the tip end of the stall fence substantially points in the desired direction of flow at the second end of the stall fence, i.e. towards the root end for the stall fence embodiment, and towards the tip end for the flow diverter embodiment.

In a further aspect, the stall fence 100 may be shaped to have a curved cross-section, wherein the extent of the curve of the stall fence may vary between the first end and the second end of the stall fence. The curved section may be varied so as to have a minimal curve towards the leading edge of the blade, and accordingly reduce the aerodynamic impact of the stall fence at the leading edge, and a more pronounced curve towards the trailing edge, thereby having an increased redirection effect towards the trailing edge of the blade.

In a further aspect, the stall fence may comprise a first relatively straight portion, e.g. provided at the base end of the stall fence, and a second relatively curved portion, e.g. provided at the tip end of the stall fence.

It will be understood that a projecting stall fence for a blade may be provided having an angle α with respect to the chordal plane of the blade, and an angle β with respect to the blade surface, the stall fence arranged such that the values α and/or β vary between the first and second ends of the stall fence, preferably in a linear variation along at least 30% of the length of the stall fence. Additionally or alternatively, the projecting stall fence may be provided with at least one curved section having a tangential angle θ, the stall fence arranged such that the value θ varies between the first and second ends of the stall fence, preferably in a linear variation along at least 30% of the length of the stall fence.

It will be understood that number or any combination of the elements of any of the preceding embodiments may be provided on a single wind turbine blade, e.g. the stall fences 70,72 of the embodiment of FIG. 4 may be combined with the flow diverters of the embodiment of FIG. 6.

The invention is not limited to the embodiment described herein, and may be modified or adapted without departing from the scope of the present invention.

The invention claimed is:

1. A wind turbine blade for a rotor of a wind turbine having a substantially horizontal rotor shaft, said rotor comprising a hub, from which the blade extends substantially in a radial direction when mounted to the hub, the blade having a longitudinal direction with a tip end and a root end and a transverse direction, the blade further comprising:
a profiled contour including a pressure side and a suction side, as well as a leading edge and a trailing edge with a chord having a chord length extending therebetween, the chord provided on a chordal plane arranged along said transverse direction, said chordal plane being a plane orthogonal to a longitudinal axis of the blade, the profiled contour, when being impacted by an incident air-flow, generating a lift,
the wind turbine further comprising at least one stall fence comprising an angled planar member, said at least one stall fence provided on a surface of said wind turbine blade and towards the root end or towards the tip end, at least a section of said at least one stall fence extending along the transverse direction of said blade at an angle to said chordal plane of between 15-60 degrees, said at least one stall fence acting to direct attached flow over the profiled contour of said blade, wherein said at least one stall fence extends from a first end adjacent said leading edge to a second end adjacent said trailing edge.

2. The wind turbine blade of claim 1, wherein the height of said at least one stall fence above the surface of the blade is at least 1.5% of the chord length of the blade at the location of said at least one stall fence.

3. The wind turbine blade of claim 1, wherein at least a first section of said at least one stall fence extends at an angle α to said chord line, wherein said angle α is between approximately +/−15-60 degrees to said chord line.

4. The wind turbine blade of claim 1, wherein said at least one stall fence extends from said first end to said second end at an angle α to said chord, wherein angle α varies from approximately 0 degrees at said first end to approximately +/−30-60 degrees at said second end.

5. The wind turbine blade of claim 1, wherein said at least one stall fence projects from a surface of said wind turbine blade, at a constant angle β to said surface, wherein said angle β is selected from the range between 45-135 degrees.

6. The wind turbine blade of claim 1, wherein said at least one stall fence projects from a surface of said wind turbine blade, at an angle β to said surface, wherein said angle β varies from approximately 0 degrees at said first end to between approximately 45-180 degrees at said second end.

7. The wind turbine blade of claim 1, wherein at least a section of said at least one stall fence comprises a cross-section having a curved portion.

8. The wind turbine blade of claim 7, wherein said at least one stall fence comprises a base end adjacent a surface of said blade, and a tip end distal from said surface, wherein at least a section of said at least one stall fence comprises a curved portion between said base end and said tip end, wherein a tangential angle θ of said curved portion varies between a first angle towards said base end and a second angle towards said tip end, wherein said first angle is substantially orthogonal to the surface of the wind turbine blade and wherein said second angle is substantially parallel to the surface of the wind turbine blade.

9. The wind turbine blade of claim 1, wherein the at least one stall fence is formed from several individual sections.

10. The wind turbine blade of claim 1, wherein the at least one stall fence comprises at least one gap provided along a length of the stall fence between a first end of said stall fence and a second end of said stall fence, wherein said gap acts to equalise pressure across the at least one stall fence, to lower the drag effect caused by the at least one stall fence.

11. The wind turbine blade of claim 1, comprising at least one stall fence provided towards the root end of the blade, said at least one stall fence extending from a first end adjacent said leading edge to a second end, and wherein at least a section of the at least one stall fence extends from said first end towards said second end at a substantially acute angle to said chord line, taken in the direction of the root end of the blade.

12. The wind turbine blade of claim 1, wherein said first end of said at least one stall fence projects beyond said leading edge, said first end forming a leading edge deflector, to direct airflow at the leading edge of said wind turbine blade towards said root end.

13. The wind turbine blade of claim 12, wherein said leading edge deflector extends from said first end towards the root end of said blade, said leading edge deflector extending at an acute angle to a nominal chord line extended beyond said leading edge.

14. The wind turbine blade of claim 1, wherein the wind turbine blade comprises at least one stall fence acting as a flow diverter provided on said suction side towards the tip end of said blade, wherein said at least one flow diverter extends from a first end adjacent said leading edge to a second end, and wherein at least a section of the at least one flow diverter extends towards said tip end at a substantially acute angle to said chord, to direct laminar flow over the profiled contour towards said tip end.

15. A wind turbine having at least one wind turbine blade as claimed in claim 1.

* * * * *